United States Patent
Hultén et al.

[11] Patent Number: 6,151,919
[45] Date of Patent: *Nov. 28, 2000

[54] WELDING DEVICE FOR OPTICAL PM-FIBERS

[75] Inventors: Ola Hultén, Bromma; Wenxin Zheng, Solna; Mats Bengtsson, Stockholm; Håkan Ekwall, Tyresö, all of Sweden

[73] Assignee: Telefonaktiebolaget LM Ericsson, Stockholm, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 09/055,129

[22] Filed: Apr. 2, 1998

Related U.S. Application Data

[62] Division of application No. 08/676,664, Jul. 10, 1996, Pat. No. 5,766,300.

[30] Foreign Application Priority Data

Jul. 11, 1995 [SE] Sweden .................................. 9502558

[51] Int. Cl.[7] .................................................. C03B 23/20
[52] U.S. Cl. ................................................................. 65/501
[58] Field of Search ....................................... 65/501, 407

[56] References Cited

U.S. PATENT DOCUMENTS

| | | |
|---|---|---|
| 4,248,499 | 2/1981 | Liertz ........................................ 65/501 |
| 4,286,979 | 9/1981 | Buckler . |
| 4,319,902 | 3/1982 | Hensel . |
| 4,326,870 | 4/1982 | Bendit ........................................ 65/501 |
| 4,345,137 | 8/1982 | Mignien ..................................... 65/408 |
| 4,372,768 | 2/1983 | Zucker . |
| 4,557,556 | 12/1985 | Decker . |
| 4,784,458 | 11/1988 | Horowitz et al. . |
| 4,958,905 | 9/1990 | Tynes . |
| 5,013,345 | 5/1991 | Itoh ............................................ 65/501 |
| 5,156,663 | 10/1992 | Itoh ............................................ 65/407 |
| 5,212,753 | 5/1993 | Maranto . |
| 5,216,733 | 6/1993 | Nagase et al. . |
| 5,340,371 | 8/1994 | Dyott ......................................... 65/501 |
| 5,417,733 | 5/1995 | Wesson . |

FOREIGN PATENT DOCUMENTS

| | | |
|---|---|---|
| 0 427 705 | 5/1987 | European Pat. Off. . |
| 0246636 | 11/1987 | European Pat. Off. . |
| 5717915 | 1/1982 | Japan ......................................... 65/407 |
| 1 576 336 | 11/1976 | United Kingdom . |

OTHER PUBLICATIONS

Electro Optics Jun. 1990 vol. 20 No. 8 p. 2.
Patent Abstracts of Japan, No. 56116008, Sep. 1981.

*Primary Examiner*—John Hoffmann
*Attorney, Agent, or Firm*—Burns, Doane, Swecker & Mathis, L.L.P.

[57] ABSTRACT

A compact fiber rotator has a guiding and support device (2) which comprises suction channels (17) formed in the angle of two blocks (3, 5), and a rotation device (32) which is attachable to the guide device (2) and comprises a house (33), a rotating toothed wheel part (37), a platform (31) attached thereto and an electric step motor (43). The fiber (1) is secured on the platform (31) by means of a standard fiber retainer (61) which is retained at the platform (31) by means of magnets (29), the rotating part (37) being located between the support (2) and the retainer (61). The suction channels (17) of the support device can be provided with a suitably low negative pressure, so that the fiber which is to be rotated and welded can be retained satisfactorily but still may be rotated against smooth surfaces of the angle of the blocks (3, 5). The toothed wheel part (37) of the rotator device is provided with a slot (45) between two gear teeth (39), in which the fiber (1) which is to be rotated and welded is placed. The electrical step motor (43) is on its output shaft provided with a gear pinion (41) which is engaged with the teeth of the toothed wheel part (39), so that the motor (43) can be controlled to rotate the fiber (1) to a desired angular position.

15 Claims, 6 Drawing Sheets

WELDING DEVICE FOR OPTICAL PM-FIBERS

This application is a divisional of U.S. patent application Ser. No. 08/676,664, filed Jul. 10, 1996 U.S. Pat. No. 5,766,300.

TECHNICAL FIELD

This invention relates to a welding device for optical PM-fibers, particularly a rotation device for rotating fibers to various angular positions which is to be used in a welding device.

BACKGROUND OF THE INVENTION

Optical PM-fibers are used for example for sensors, where the polarisation state of light used when communicating information through the optical fibers must be strictly controlled. Commercially available polarisation maintaining fibers are constructed like ordinary optical fibers comprising a centrally located core and a surrounding sleeve or cladding having a cylindrical exterior surface. Moreover, in the cladding, as seen in a cross sectional view, in a common kind of PM-fibers, two separate, substantially identically regions of highly doped glass, "stress zones" are provided, this structure resulting in that a PM-fiber is not rotationally symmetric in its physical structure nor in its optical structure. When connecting such PM-fibers to each other it is naturally important that the asymmetric regions such as said stress zones of the two ends of the fibers are placed opposite each other before the very splicing process, so that the polarisation axes of the fibers are aligned with each other and will remain so after the splicing. Other kinds of optical PM-fibers have other types of axial asymmetries, but in the splicing the asymmetries should generally be aligned with each other. Therefor a controlled rotation is required of at least one of the fibers immediately before or in the splicing process.

U.S. Pat. No. 4,986,843, U.S. Pat. No. 5,147,434, U.S. Pat. No. 5,149,350, and U.S. Pat. No. 5,156,663 all disclose welding devices for splicing optical PM-fibers, the welding devices comprising rotation means for adjusting the angular position of the fibers before the splicing process. The devices comprise, as seen from the exterior, far end of the fibers, in a direction towards the splicing position, rotation devices 44A and 44B having support devices 62 comprising V-grooves 66 and clamping devices 61 at their interior, proximate ends, support blocks 24 comprising clamping devices 26 located adjacent thereto for clamping fiber portions having remaining protective coatings and retaining devices 22 and support devices 20 comprising V-grooves for the naked fiber portions most adjacent to the splicing position and welding electrodes 38 and optical devices for viewing/imaging the fiber ends at the splicing position and for aligning the fiber ends. The first rotation device 44A is intended to be rotated manually by means of a slotted knob 48. The rotation device 44A comprises in addition to said knob a platform 42 and a retaining means 61, see FIG. 7. The second rotation device 44B is identical to the first one except that it is provided with a slotted gear pinion instead of a knob and is intended to be rotated by means of an electric motor 72 through a gear transmission 74, 76. This construction is complicated, has in addition a large extension in the longitudinal direction of the fibers and three support parts or retaining/clamping devices on each side of the splicing position.

In the article "A simple technique for high accuracy core-cladding concentricity measurement of single mode fibers", D N Ridgway, L. J. Freeman, Technical digest—Symposium on optical fiber measurements 1982, pp. 139–142, a simple and reliable technique is described for determining the concentricity of the core of an optical fiber in relation to its cladding. A test measurement equipment is shown in FIG. 2 consisting of a manual rotation device, a positioning device and a vacuum chuck.

SUMMARY OF THE INVENTION

It is an object of the invention to provide a rotation device for optical fibers to be used in connection with splicing the fibers, the device being generally suited for accomplishing an accurately determined position of the fibers.

It is a further object of the invention to provide a rotation device for optical fibers to be used in connection with splicing the fibers to each other, the rotation device utilizing an angular groove or support angle, in which the end of the fiber rests and is maintained in an accurately determined position radially or laterally but can still be rotated to different angular positions without losing the accurately determined position.

It is a further object of the invention to provide a rotation device for optical fibers to be used in connection with splicing the fibers to each other having a simple and compact structure, in particular having a short extension in the longitudinal direction of the fibers.

It is a further object of the invention to provide a rotation device for optical fibers to be used in connection with splicing the fibers to each other having a reliable design of guide and positioning means for the fibers, allowing the fibers to be rotated maintaining the locations of their symmetry axes.

The problem to be solved by the invention is thus to provide a rotation device for a fiber splicer or a fiber splicer having rotation facilities having a simple and compact construction comprising guide means for the fibers ends allowing them to be rotated while maintaining the axial and longitudinal position of the fiber ends.

This problem is solved by a fiber rotator including a support or retaining and guiding device comprising a specially designed guide angle device having suction channels connected thereto. Further the rotator includes a rotation device connectable to the retaining and guiding device, the rotation device comprising a rotatable gear portion, a platform thereto and an electrical step motor. The suction channels of the retainer device can be provided with a suitably low negative pressure, so that the fiber that is to be rotated and welded can be sufficiently retained but still be rotated against smooth surfaces on blocks comprised in the retaining and guiding device. The gear portion is located between the platform, where the fiber is securely held for maintaining its longitudinal position, and the retaining and guiding device.

The gear portion of the rotation device is provided with a slot between two gear teeth, in which the fiber that is to be rotated and welded is placed. The fiber is then rigidly attached to the platform by means of a retainer of standard type, that is retained at the platform by means of magnets arranged on the platform. The electrical step motor is provided, on its output shaft, with a gear pinion engaging the teeth of the gear portion, so that the motor can be controlled to rotate the fiber to a desired angular position.

The device thus utilizes, on each side of the splicing position, only one support angle and only one retainer device unlike the prior devices disclosed in the U.S. patents cited above. Also, the fibers extend substantially along a straight line through the device and the fibers are not bent as in the devices of said U.S. patents. This is allowed by the vacuum guide means or vacuum chucks of the support means not requiring any elastic force derived from the bent portions of the fibers in order to keep them well inside the guides as in the prior art. The guide means are built of basically rectangular blocks, the guide angles being formed at the position where one free surface of a first block connects to a larger surface of a second block, where only a portion of this large surface is free, the other portion being engaged with a surface of the first block. This design does not require the conventional V-grooves to be formed in a surface of guide blocks, the accurate and difficult manufacture of the V-grooved thus being avoided.

Also, by providing the gear mechanism between the platform, at which the fibers are firmly clamped by means of standard retainers and which is rigidly attached to a toothed wheel of the mechanism, and the retaining and guiding device, the rotator is made compact having a small extension in the fiber longitudinal direction and still allowing a rather long free fiber distance between the clamps and the fiber end guiding device. This long free distance will permit small lateral misalignments of the clamped fiber portions and the portions held by the guiding device.

Thus generally, a device for rotating an optical fiber about its longitudinal axis comprises a rotatable retainer, that is mounted to be rotated about an axis, and a fixedly arranged support device or guiding device having a support groove or support angle, so that an optical fiber can rest in the support groove or angle having its longitudinal axis substantially aligned with the rotation axis of the rotatable retainer. On the rotatable retainer a retainer means can be mounted, such as a detachable fiber retainer of standard type, for retaining an optical fiber having the longitudinal axis thereof substantially extending along the rotational axis of the rotatable retainer. The rotatable retainer has an essentially cylindric bearing portion having the symmetry or rotational axis thereof coinciding with the rotational axis of the retainer and the bearing portion is rotatably mounted in a geometrically fixedly mounted frame portion. This bearing portion is arranged between the fixedly arranged support device and the retainer means on the rotatable retainer, resulting in a short total length of the device having as few retaining and support points for the fiber ends as possible.

For a simple insertion of a fiber end a notch or slot is arranged in the bearing portion extending in a plane through the axis of the bearing portion, from the outer side of the bearing portion and past the axis thereof. This notch or slot has such a width and such a depth that an optical fiber can be placed in the notch having its longitudinal axis extending along the axis of the bearing portion with some play to the sides and the bottom of the notch. Further, a corresponding notch or slot is arranged in the frame portion extending from an outer side thereof and into the bearing room where the bearing portion is mounted. The notch or slot in the frame portion has such a width and is located in such a way that the bearing portion can be rotated to alignment of its notch or slot with the notch or slot of the frame portion, allowing the fiber in this position to be inserted laterally or radially through the aligned notches or slots in order to be positioned along substantially the rotational axis of the retainer and the bearing portion.

For a motorised driving of the rotational movement, for example by means of a step motor, a toothed ring can be arranged on the bearing device for cooperation with a drive pinion on a motor. The slot in the bearing device then extends suitably through a gap between two gear teeth on the toothed ring.

When rotating a fiber end it is important that the rotation is made without any axial play or play in the longitudinal direction of the fiber end. Therefor a support ring in the frame portion is pressed against a surface of the bearing portion, that is perpendicular to the axis, by means of a magnetic repulsive force that is derived from one magnet arranged in the frame portion and one magnet arranged in the bearing portion.

The fixedly arranged support device for the outmost portion of a fiber end comprises advantageously two substantially flat support surfaces located in an angle, for example in a right angle, in relation to each other, so that the fiber end can rest in the angle supported by the two support surfaces and having its longitudinal axis substantially aligned with the rotation axis of the rotatable retainer. For retaining rotatably the outmost portion of the end one or more channels are provided having their mouths in or at the angle vertex formed by the two support surfaces. These channels are, at some distance from their mouths, connected to a vacuum or negative pressure device or source, so that a fiber mounted in the angle between the support surfaces will be retained at the angle vertex when the negative pressure device is activated sucking air out from the channels.

The openings or mouths of the negative pressure channels can advantageously be elongated having their longitudinal direction in parallel to the intersectional line of the support surfaces in the angle formed therebetween and further they should be so narrow that a fiber cannot be sucked into the openings. A suitable condition is that the openings are more narrow than or equal to half the exterior diameter of the naked fibers, that is fibers having no protective coating, for which the device is intended to be used.

The openings or mouths of the channels are then located preferably having their centres located along a line parallel to the intersection line of the support surfaces in the angle therebetween.

The support device can be composed of two support portions on which exterior sides are provided, so that an exterior side on each support portion forms one of the two support surfaces of a fiber. One of these exterior sides engages a surface on the other support portion, so that the intended angle is formed. Generally, thus, on one of the support portions the substantially flat support surface is prolonged or extended and a side surface on the other support portion connects to the support surface of the other support portion and engages the extended support surface on the first support portion, so that the angle between the support surfaces is formed at the place where this engagement surface on the second support portion engages the support surface on the first support portion. One or more recesses or shallow grooves are provided in the engagement surface on the second support portion and extend from the support surface on the second support portion for forming the channels.

The recesses are advantageously made as parallel grooves extending substantially perpendicularly to the connection line of the engagement surface and the support surface on the second support portion, this connection line being the angle vertex mentioned above.

A further recess can be provided in the engagement surface on the second support portion and it then connects to the recesses which connect to the support surfaces and form the channels. The further recess has a larger depth than the channels and forms a suction case and is then connectable to the negative pressure source.

Between the recesses which connect to the support surface on the second support portion and form the channels, portions are provided having a width in the direction of the intersection line between the support portions, i.e. in the direction of the angle point line, that is considerably smaller than the width of the recesses, in the same direction, and this width can in particular be at most ⅕ of the width of the recesses. This will improve the supporting function of the angle, still allowing the openings of the channels to be so wide that they are easily cleansed from dirt particles.

BRIEF DESCRIPTION OF THE DRAWINGS

The invention will now be described by way of example as a specific, not limiting embodiment with reference to the accompanying drawings in which:

FIG. 1b is view from above of the support device of FIG. 1a,

DETAILED DESCRIPTION

Figure 1A:
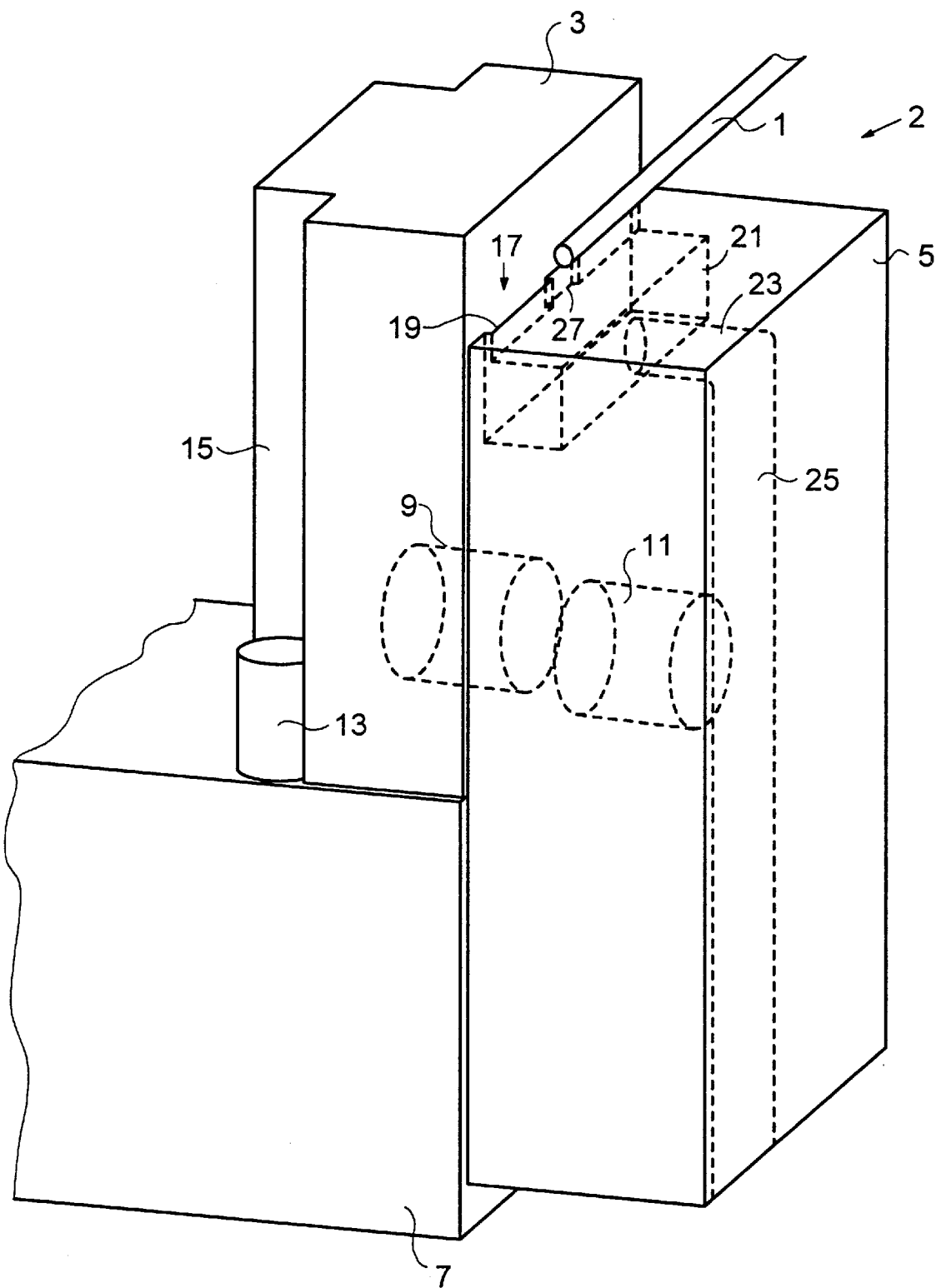
FIG. 1a is a perspective view of a support device.

In a splicing device for optical fibers, where the fibers are to be rotated before splicing, i.e. to be rotated about their longitudinal direction to a correct angular position for splicing, a outermost portion of an end of a fiber 1 is supported and guided by a support or retaining and guiding device 2. The fiber end rests in an angle formed between two substantially rectangular blocks 3 and 5, as illustrated in FIG. 1a. The fiber 1 is here shown not to extend all the way in the angle as in regular use for splicing, compare FIG. 4. The blocks 3, 5 are placed at each other and engage each other along essentially vertical side surfaces. The fiber ends thus rest in the angle being formed by an essentially vertical, flat side surface of the first block 3 and the upper, essentially horizontal surface of the second block 5, where the very angle is thus formed by the offset of the top surfaces of the blocks, that is by the provision that the upper surface of the first block 3 is located higher than the upper surface of the second block 5.

Figure 4:
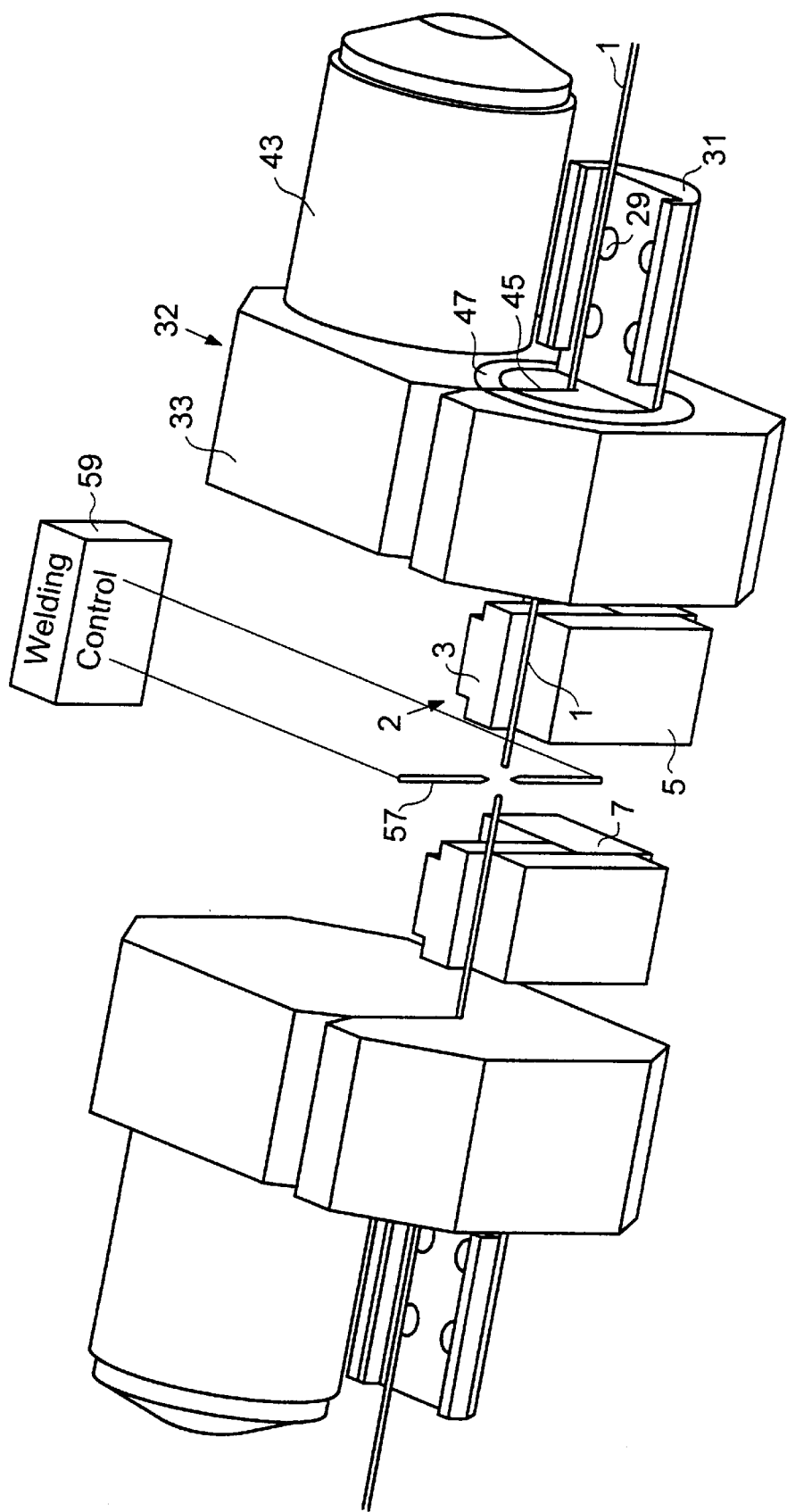
FIG. 4 is a perspective view of a fiber welding device including the support and rotation devices of FIGS. 1a–3, FIGS. 5a and 5b are views from the front and from above respectively of a fiber retainer.

The second block 5 has its vertical side that connects to the first block 3, also fixedly mounted to the essentially vertical side of a substantially rectangular base block 7, see also FIG. 4, that is attached to a larger base element, not shown. The first block 3 rests with its under surface against the upper surface of the base block 7, thus also the bottom surface of the blocks being offset. The side block 3 can be detached, e.g. for cleaning or inspection purposes, from its position at the vertical side surface of the second block 5 and is retained in its proper position by means of magnets 9 and 11 placed in cavities in the respective blocks 3, 5. For guiding the first block 3 and in particular maintaining its position in the longitudinal direction of a supported fiber, guide columns 13 are provided, standing up from the base block 7 into rectangular recesses or guide grooves 15 formed by simple rectangular steps, at the rear side edges of the first block 3. These rear steps or grooves extend in substantially vertical directions and have a distance of their parallel surfaces adapted to the distance of the guide columns 13 of each other. All blocks 3, 5 and 7 have the same width in the longitudinal direction of a supported fiber or of the support angle vertex line formed by the intersection line of the top surface of the second block 5 and the vertical engagement surface of the first block 3.

Figure 1B:
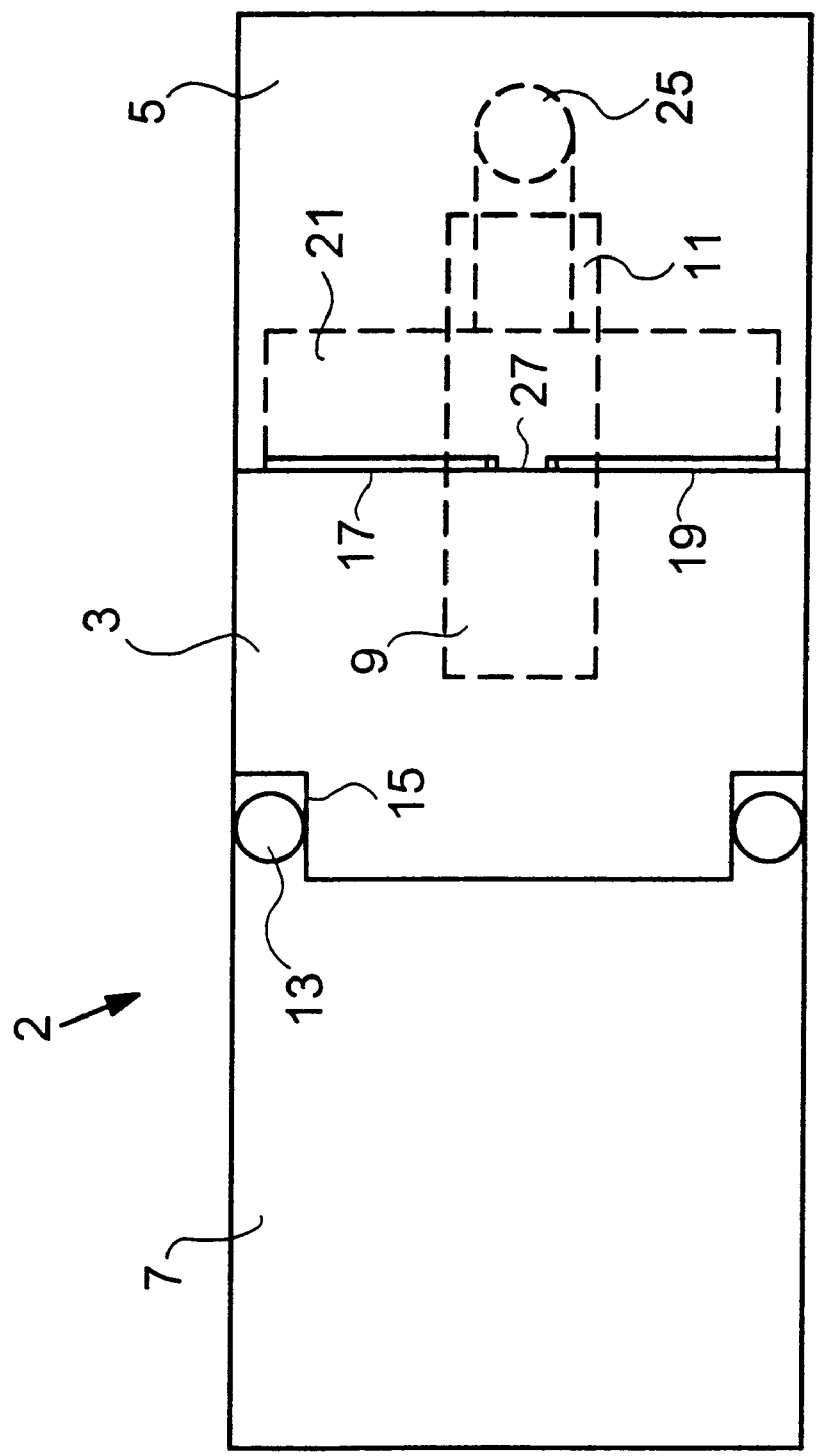

In the angle between the first and second blocks 3, 5 suction channels 17 are provided that are formed by grooves 19 made in that side surface of the second block 5 that is engaged with the first block 3, see also the view from above in FIG. 1b. These suction channels 17 connect to a suction case 21 inside the second block 5, that is configured as a deep rectangular recess in the same vertical side surface and is connected to a vacuum source, not shown, through channels 23, 25 drilled in the second block 5. The grooves 19 for forming the suction channels 17 in the angle extend in vertical directions, in parallel to the vertical side surfaces and edges of the second block 5 and are very shallow, having a depth less than half or at most equal to the fiber diameter of the most narrow type of optical fiber that can be used.

The grooves 19 are further in the preferred embodiment at least two and are separated by rather thin partition walls, in the embodiment illustrated only one wall 27, at the upper end of which the fiber 1 can also be supported if required. The suction case 21 has exterior vertical side surfaces that are perpendicular to the engagement surface of the block 5 with the first block 3 and are located in the same plane as those outermost side surfaces of the grooves 19, which are located most adjacent to the other vertical side surfaces of the second block 5 that connect to the engagement surface with the first block 3. For a suitably low negative pressure applied in the channels 19 formed by the grooves 19 the fiber 1 can be sufficiently retained and still rotated against or on, i.e. be rotated about its longitudinal axis in contact with, the smooth surfaces of the blocks 3 and 5. The region of the fiber 1 located most close to the end is in a splicing procedure normally rid of its exterior plastic layer and thus a cylindrical body of a glass material then rests in the angle between the blocks 3 and 5.

Figure 2:
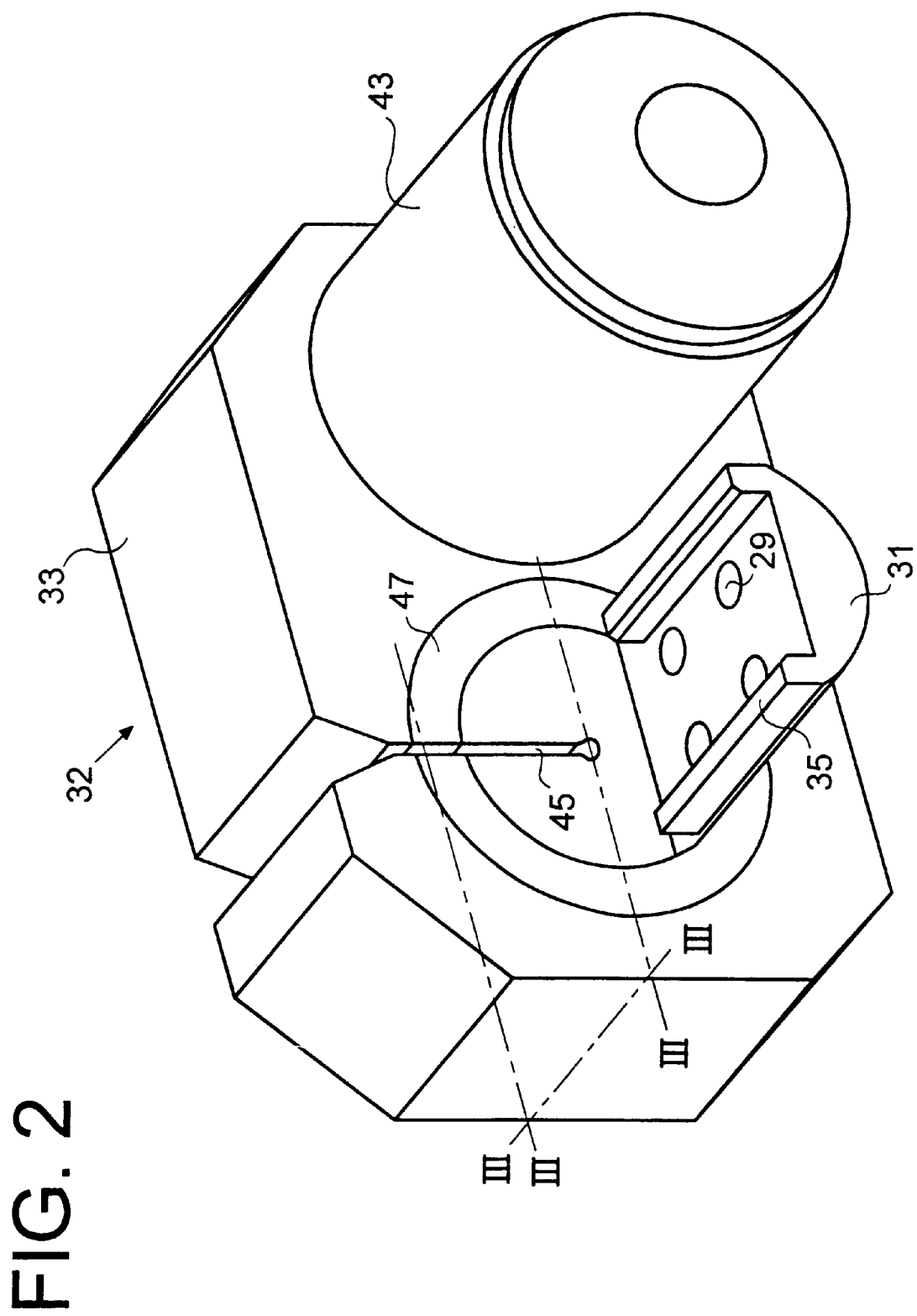
FIG. 2 is a perspective view of a rotation device.
Figure 3:
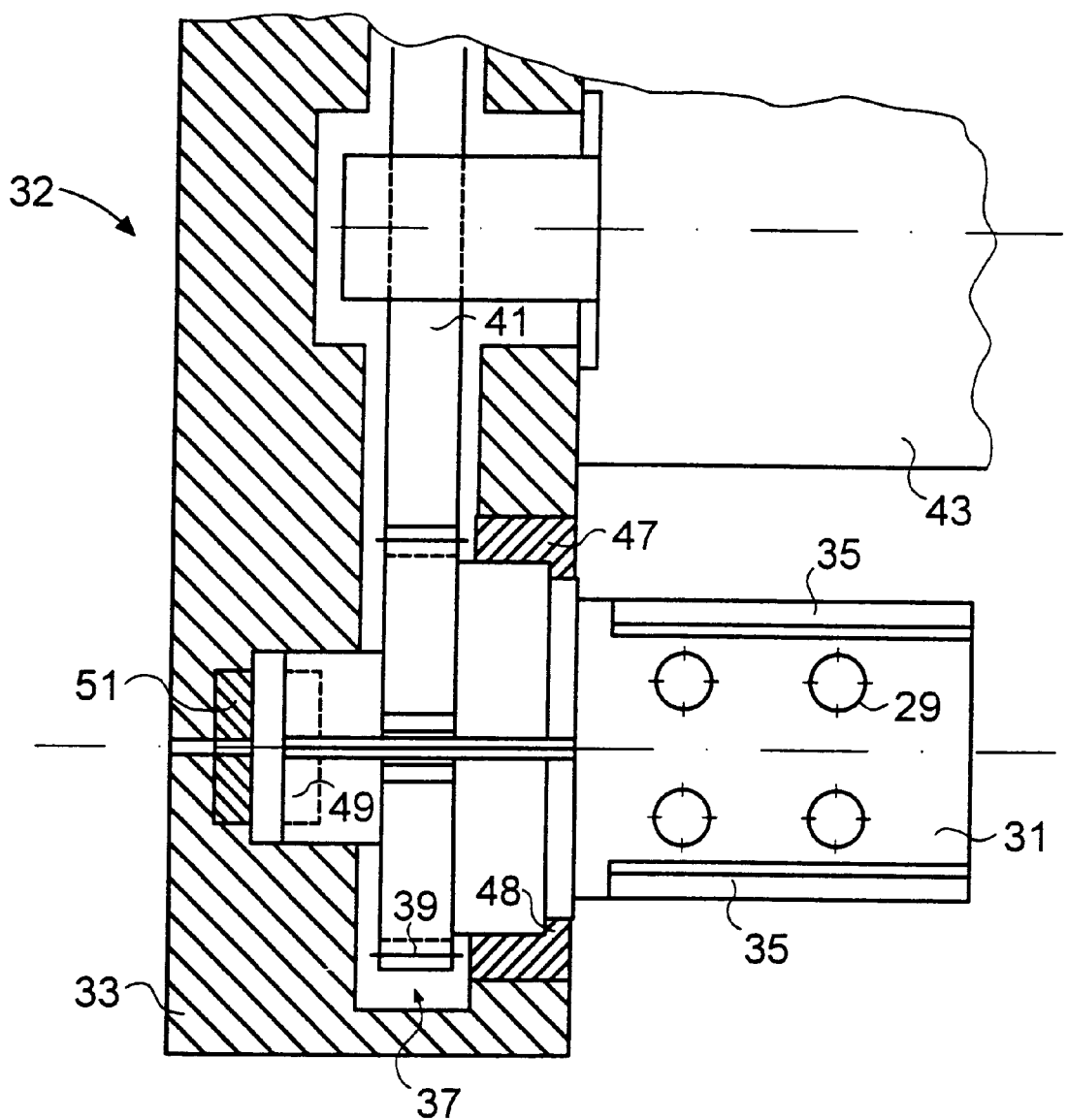
FIG. 3 is a sectional view as taken along the lines III—III in FIG. 2 showing a rotatable support table or platform for a fiber retainer.
Figure 5A:
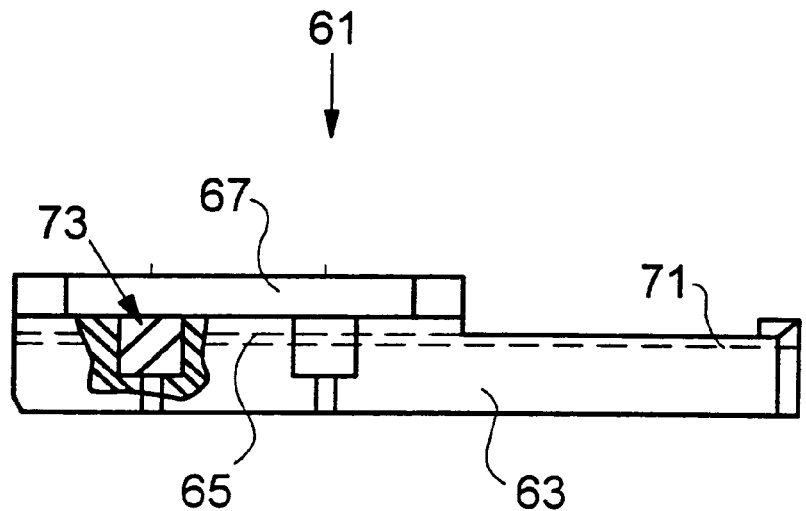
Figure 5B:
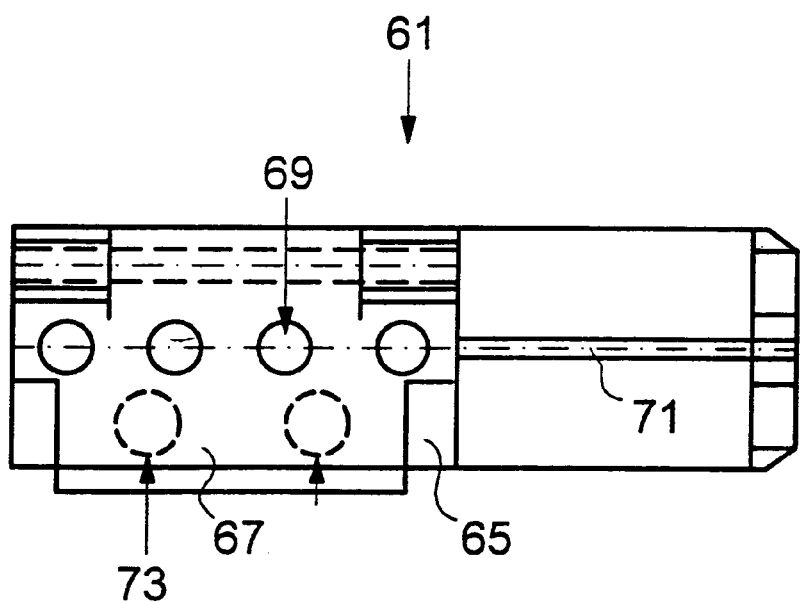

In the adjacent fiber region where the exterior protective cover remains and has not been removed, the fiber 1 is firmly held in a detachable retainer of standard type, e.g. as shown in FIGS. 5a and 5b. This detachable retainer is positioned and is retained by means of magnets 29 against ribs 35 upstanding at the sides of a platform or projecting portion 31, see the perspective view of FIG. 2, belonging to a rotatable part in a turning or rotation device 32. The very rotatable part is illustrated as seen from above in FIG. 3 and it comprises, in addition to the platform 31 including the magnets 29 and the marginal ribs 35 with which the detachable fiber retainer is to be engaged, a gear or bearing portion 37 placed in a cavity or room inside the rotator house 33. Teeth 39 are arranged on this portion for engaging a gear pinion 41 on the shaft of an electric step motor 43, see FIG. 2. A slot 45, see FIG. 2, extends through the gear portion 37 in the centre of a gap between two gear teeth 39 into the centre of the rotatable portion 31, 37. In the rotator house 33 also a fixed bearing ring 47 is arranged at one side, the side distant from the support device 2. The entire rotating part 31, 37 is in contact with this bearing ring 47 in an axially, accurately defined position by the fact that it is pressed against the bearing ring 47 to engage, with a flat annular surface thereof, that is perpendicular to the axis of the rotating part, a corresponding interior surface of the bearing ring 47. The bearing ring 47 also serves as a radial bearing and has an interior stepped surface, so that a projection 48 extending radially inwards is formed, with the interior side of which the rotating part 31, 37 is engaged by a suitable biasing force.

The axial biasing of the rotating part 31, 37 against the bearing ring 47 is provided by the repulse force of two magnets 49 and 51, one of which 49 is located at the interior end of the rotating part, i.e. inside the house 33, and the other one 51 of which is fixedly mounted in the house. The magnet 49 that is located in the rotating part 31, 37 is provided with a slot in the same way as the rotating part and it is aligned with its slot 45. The magnets 49 and 51 have thus their poles so arranged that they repel each other. A fiber can be introduced in this slot 45 in the case where the rotating part 31, 37 is in a position having this slot 45 directed upwards, by the fact that corresponding slots 53 and 55 are arranged in the bearing ring 47 and in the house 33 respectively and also in the fixed magnet 51.

A retainer 61 that can be attached to the platform 31 is illustrated in FIGS. 5a and 5b. It comprises a generally rectangular, elongated base plate 63 having an elevated portion 65 at its one end. A lid 67 is hinged to the rear side of the elevated portion and comprises resilient cylindrical cushions 69 pressing a fiber inserted in the retainer into a V-groove 71 extending all over the retainer 61 in the longitudinal direction thereof. The fiber is then firmly held in the groove when the lid 67 is folded down, magnets 73 in the base plate 63 then attracting the lid 67 and holding it a this position. The lid 67 can be made of a soft magnetic material. These magnets 73 also cooperate with the magnets 29 on the platform to firmly hold the retainer 61 at the platform 31 in contact with the upstanding ribs 35 at one side thereof.

In FIG. 4 the rotator device is illustrated as being used for rotating fibers in association with the splicing process of two optical fibers, in particular in a fiber welding device. Thus two rotation devices 32 are provided that are inverted or reflected images of each other, and two identical support devices 2 are provided in which the fibers 1 are in contact in accurately determined positions. All the devices are mounted at some base element, not shown, for example one movable base plate at each side of the splicing position, so that two laterally movable units are formed. The support devices 2 are placed most adjacent to the splicing position and the rotators 32 have their platforms 31 located remote from this position, the fiber ends thus extending from the detachable fiber retainers 61 into the house 33 and inside the rotating and bearing portion 37 and therefrom to be supported by the support and guiding devices 2. When the devices are mounted at their base plates it must thus be considered that the rotation axes of the rotation devices 32 and the axes of fibers 1 placed in the angle of the support blocks 3, 5 are rather well aligned with each other at each side of the splicing position. However, the rather long distance from the platforms 31 to the guide surfaces still allow some minor misalignment not disturbing the positions of the outermost fiber end portions significantly. In the very welding procedure for splicing the support devices 2 must then be aligned with each other very accurately in order to achieve that the fiber ends also will be very well aligned with each other. Then the devices at each side of the welding position could for example be mounted on movable retainer means, the movements of which can be very accurately controlled.

The welding is performed by supplying electrical high voltage from a welding control unit 59 to welding electrodes 57 having their points located at the splicing position. The control of the rotation, alignment and welding can be made as is disclosed in e.g. International Patent Application No. PCT/SE94/00146, which is incorporated herein by reference.

What is claimed is:

1. A device for rotating an optical fiber, comprising:
    a first rotator device including a housing and a rotating part rotatable about an axis of rotation, the rotating part including a slot for receiving a first portion of an optical fiber, such that the longitudinal axis of the first portion of the optical fiber is substantially coaxial with the axis of rotation;
    a fixed support device having first and second substantially flat support surfaces arranged at an angle in relation to each other and that intersect along a line parallel to the rotation axis to define an interior corner for supporting a second portion of the optical fiber; and
    at least one channel having an opening formed at the interior corner and connectable to a negative pressure device so that the second portion is retained at the corner by a vacuum drawn by the negative pressure device;
    wherein the second portion and the first portion are separated by and connected to a free third portion of the optical fiber, and the longitudinal axis of the second portion of the optical fiber is substantially aligned with the rotation axis.

2. The device of claim 1, wherein the first and second substantially flat support surfaces are substantially perpendicular to each other.

3. The device of claim 1, wherein an opening of at least one channel is elongated in a direction parallel to the intersection line of the support surfaces, and the opening has a width sufficiently narrow so that an edge surface of the second support surface adjacent to the opening supports the second portion of the optical fiber, thereby preventing the second portion from being sucked into the opening.

4. The device of claim 3, wherein the opening has a width not greater than half an exterior diameter of the second portion of the optical fiber.

5. The device of claim 1, comprising at least two channels having openings elongated in a direction parallel to the intersection line of the support surfaces.

6. The device of claim 5, comprising a bridging portion between the at least two channels for further supporting the optical fiber to be rotated by the device, the bridging portion having a length in a direction parallel to the intersection line of the support surfaces that is smaller than lengths in that direction of the openings of the at least two channels.

7. The device of claim 6, wherein the bridging portion has a length in the direction parallel to the intersection line of the support surfaces that is at most ⅕ of the lengths in that direction of the openings.

8. A device for rotating an optical fiber, comprising:
    a rotatable retainer for holding a first portion of an optical fiber mounted for rotation about a rotation axis substantially aligned with a longitudinal axis of the first portion and for rotating the first portion and thereby portions of the optical fiber connect to first portion; and
    first and second support blocks forming a fixed support device, a substantially flat, first surface of the second support block placed directly adjacent a flat, first surface of the first support block, leaving a free portion of the first surface of the first block, the free portion forming a first support surface and a flat, second surface of the second support block connected to the first surface of the second support block forming a second support surface, the first and second support surfaces intersecting to define an interior corner for supporting a second portion of the optical fiber, the first and second portions being separated by and connected to a free third portion of the optical fiber, the first and second support blocks being arranged so that the second portion of the optical fiber has a longitudinal axis substantially aligned with the rotation axis, at least one groove provided in the first surface of the second support block and ending in the second surface of the second support block portion for forming at least one channel which opens at the interior corner, the at least one channel being connectable to a negative pressure device so that the second portion of the optical fiber is retained at the interior corner by a vacuum drawn by the negative pressure device.

9. The device of claim 8, wherein the at least one groove forms an opening of the at least one channel in the second surface of the second support block, the at least one groove having a width in a longitudinal direction of the interior corner making the opening elongated in the longitudinal direction of the interior corner and the at least one groove having a depth making the opening sufficiently narrow so that surfaces adjacent the opening support the second portion of the optical fiber to prevent it from being sucked into the opening.

10. The device of claim 9, wherein the opening has a width not greater than half an exterior diameter of an optical fiber to be rotated by the device.

11. The device of claim 8, wherein at least two grooves each forming a channel are provided, the at least two grooves being parallel to each other and each ending in the second surface of the second support block for forming an opening of the respective channel, the openings having centers placed along a line parallel to a longitudinal direction of the interior corner.

12. The device of claim 11, wherein a support portion is provided between the openings, the support portion having a width in the longitudinal direction of the interior corner considerably smaller than a length of the openings in the longitudinal direction of the interior corner.

13. The device of claim 12, wherein the width of the support portion is at most $\frac{1}{5}$ of the length of the openings.

14. The device of claim 8, wherein the at least one grove extends substantially perpendicularly to a longitudinal direction of the interior corner.

15. The device of claim 8, further comprising a cavity in the first surface of the second support block, the cavity connecting to each of the at least one groove and having a depth larger than a depth of the at least one groove for forming a suction case and being connectable to the negative pressure source distributing the negative pressure to each of the at least one groove.

* * * * *